United States Patent [19]
Ogawa et al.

[11] Patent Number: 4,717,758
[45] Date of Patent: Jan. 5, 1988

[54] PAPERMAKING ADDITIVE

[75] Inventors: Masatomi Ogawa, Ichihara; Mayumi Narushima, Chiba, both of Japan

[73] Assignee: DIC-Hercules Chemicals, Inc., Tokyo, Japan

[21] Appl. No.: 898,495

[22] Filed: Aug. 21, 1986

[30] Foreign Application Priority Data

Aug. 22, 1985 [JP] Japan ................... 60-183128

[51] Int. Cl.$^4$ .................. C08F 226/02; C08F 226/03
[52] U.S. Cl. .................. 526/307; 526/318.2; 526/307.3
[58] Field of Search ............... 526/318.2, 307.3, 307

[56] References Cited

U.S. PATENT DOCUMENTS

| | | | |
|---|---|---|---|
| 3,043,822 | 7/1962 | Maeder | 526/307.3 |
| 3,776,892 | 12/1973 | Bleyle | 526/307.3 |
| 3,957,710 | 5/1976 | Rohmann et al. | 526/346 |
| 4,218,554 | 8/1980 | Foley, Jr. | 526/923 |
| 4,271,058 | 6/1981 | Trabitzsch et al. | 524/399 |
| 4,314,044 | 2/1982 | Hughes et al. | 526/318.2 |

*Primary Examiner*—Joseph L. Schofer
*Assistant Examiner*—N. Sarofim
*Attorney, Agent, or Firm*—Sherman and Shalloway

[57] ABSTRACT

A papermaking additive useful for papermaking in a neutral to alkaline pH region which comprises a water-soluble copolymer comprising (a) 1 to 20 mole % of dimethylaminopropyl (meth)acrylamide or its quaternized product, (b) 0.1 to 12 mole % of itaconic acid or its salt, and (c) 98.9 to 68 mole % of acrylamide, the (b)/(a) mole ratio being from 0.1 to 0.6.

8 Claims, No Drawings

PAPERMAKING ADDITIVE

BACKGROUND OF THE INVENTION

1. Field of the Invention

This invention relates to an additive for papermaking which is particularly useful for papermaking in a neutral to alkaline pH region. It enhances the strength of paper and increases the retention of a filler in papermaking using the filler, and the retention of a sizing agent in papermaking using the sizing agent.

2. Description of the Prior Art

The acid sheet forming process using alum has mainly been used heretofore in papermaking. However, according to the acid sheet forming process, the resulting paper is susceptible to degradation and the paper machine undergo corrosion. Moreover, as the papermaking process is carried out in a closed system, the treatment of the white water and waste water, the corrosion of paper machines, etc. become serious problems. For these reasons, sheet formation in a neutral to alkaline pH region has attracted attention as a process superseding the acid sheet forming process.

With this move to higher pH papermaking, it has become possible to use alkaline fillers, such as calcium carbonate, which are available at low costs but cannot be used in the acid sheet forming process. This has led to the requirement for a papermaking additive which can be used in sheet formation in a neutral to alkaline pH region and which can increase paper strength and the retention of a filler and a sizing agent.

Acrylamide polymers have previously been known to have an excellent paper strength increasing effect. It is known that the acrylamide polymers can be rendered of ionic character by, for example, the Hofmann rearrangement reaction, the Mannich reaction, or the copolymerization with a cationic monomer of an anionic monomer. The Hofmann rearrangement reaction product of polyacrylamide has been variously studied because of its excellent properties. But its stability has not been improved and it cannot be free from degradation in properties with time. The Mannich reaction product decreases in cationic character under neutral to alkaline papermaking conditions, and cannot fully exhibit its effect.

Japanese Laid-Open Patent Publication No. 94697/1985 discloses a paper strength increasing agent comprising a water-soluble copolymer derived essentially from (A) a water-soluble cationic monomer, (B) an alpha, beta-unsaturated dicarboxylic acid or its salt, and (C) (meth)acrylamide. When the cationic monomer (A) is an ester typified, for example, by dimethylaminoethyl methacrylate, the cationic property of this copolymer decreases in a neutral to alkaline pH region, and moreover, the copolymer is susceptible to hydrolysis. On the other hand, if the cationic monomer (A) is dimethylaminopropyl (meth)acrylamide or its quaternized product but the alpha, beta-unsaturated dicarboxylic acid (b) is maleic acid, fumaric acid or its salt, the resulting paper strength increasing agent does not fully show its properties when used in the alkaline sheet forming process using calcium carbonate as a filler.

SUMMARY OF THE INVENTION

It is an object of this invention to provide a copolymer compared essentially of dimethylaminopropyl (meth) acylamide or its quaternized product, itaconic acid or its salt, and acrylamide as a papermaking additive having excellent performances in papermaking in a neutral to alkaline pH region.

It has now been found that a copolymer composed essentially of dimethylaminopropyl (meth)acrylamide or its quaternized product, itaconic acid or its salt, and acrylamide can be a papermaking additive which has an excellent paper strength increasing agent and increases the retention of a filler and a sizing agent in papermaking in a neutral to alkaline pH region.

According to this invention, there is provided a papermaking additive useful for papermaking in a neutral to alkaline pH region which comprises a water-soluble copolymer composed of (a) 1 to 20 mole % of dimethylaminopropyl (meth) acrylamide or its quaternized product, (b) 0.1 to 12 mole % of itaconic acid or its salt, and (c) 98.9 to 68 mole % of acryl-amide, the (b)/(a) mole ratio being from 0.1 to 0.6.

DETAILED DESCRIPTION OF THE INVENTION

It is believed that since dimethylaminopropyl (meth)acrylamide or its quaternized product used as the cationic monomer (a) is of the amide-type, it is less susceptible to hydrolysis than the ester-type cationic monomer, and retains its cationic character even in a neutral to alkaline pH region. The present inventors have extensively studied the anionic monomers (b), and have found that among dibasic acids which are superior to monobasic acids, itaconic acid or its salt produces a particularly good effect when used in combination with the cationic monomer (a).

With regard to the ratio of the three essential components, the effect of increasing the retention of a filler and a sizing agent tends to become greater as the proportion of the component (a) forming a cation site is higher. On the other hand, as the proportion of the component (a) increases, the paper strength increasing effect of the copolymer tends to decrease. As the proportion of the component (a) as a cation site becomes larger, it is easier to adsorb and flocculate the filler and the sizing agent. Consequently, the retention of the filler and sizing agent becomes high. On the other hand, this results in a decrease in the proportion of the amide group which is considered to have a paper strength increasing effect by hydrogen bonding with the hydroxyl groups of cellulose. This is presumably the reason for decreased paper strength. To provide a papermaking additive, it is important to balance these properties, and an optimum combination of these properties becomes necessary. The present inventors have made extensive investigations to provide a papermaking additive which has an excellent effect of increasing paper strength and the retention of the filler and sizing agent, and have found that an optimum result is obtained by using 1 to 20 mole %, preferably 2 to 10 mole %, of the component (a), 0.1 to 12 mole %, preferably 0.2 to 6 mole %, of the component (b), and 98.9 to 68 mole %, preferably 97.8 to 84 mole %, of the component (c), the (b)/(a) mole ratio being in the range of from 0.1 to 0.6.

In addition, to these three essential components, it is possible to use additional comonomers, for example, a cationic vinyl monomer such as dimethylaminoethyl (meth)acrylate or its quaternized product; a vinylcarboxylic acid or its salt such as acrylic acid, methacrylic acid, fumaric acid or maleic acid. An amount, not to impair the water-solubility of the copolymer, of a hydrophobic monomer such as styrene, acrylonitrile, ethyl acrylate or methyl methacrylate, can also be used.

When the cationic vinyl monomer is used, its amount should be added to the amount of the component (a), and when the vinylcarboxylic acid is used, its amount should be added to the amount of the component (b). Under these conditions, the (b)/(a) mole ratio should be within the range of from 0.1 to 0.6.

The copolymer used in this invention as a 10% by weight solution usually has a viscosity of 300 to 100,000 cps (Brookfield viscosity at 25° C.), preferably 800 to 20,000 cps. If its malecular weight is too low (i.e. a low viscosity), its effect of increasing the retention of the filler or sizing agent is poor. If its molecular weight is too high, or it has a high viscosity, it has an excellent effect of increasing the retention of the filler or sizing agent but undergoes excessive flocculation so that it adversely affects paper strength.

The papermaking additive of this invention can be synthesized by known polymerization reactions. For example, it can be prepared by adding a chain transfer agent such as isopropyl alcohol, allyl alcohol, sodium hypophosphite or sodium allylsulfonate to an aqueous solution into which are fed predetermined amounts of dimethylaminopropyl (meth)acrylamide or its quaternized product, itaconic acid or its salt, and acrylamide, adding a polymerization initiator composed of a persulfate such as ammonium persulfate, potassium persulfate or sodium persulfate or a mixture of such a persulfate with a reducing agent such as sodium hydrogen sulfite at a pH of 3 to 6, adjusting the monomer concentration to 5 to 30% by weight, and stirring the mixture at 35° to 95° C. for 1 to 10 hours.

The following Examples and Application Examples illustrate the present invention more specifically. All percentages are by weight unless otherwise specified.

EXAMPLE 1

A 1-liter four-necked flask equipped with a stirrer, a thermometer, a reflux condenser and a nitrogen gas introducing tube was charged with 543.2 g of water, 1.04 g of itaconic acid, 7.49 g of dimethylaminopropyl acrylamide, 219.5 g of a 50% aqueous solution of acrylamide, and 16.82 g of a 2% aqueous solution of sodium hypophosphite, and the pH of the mixture was adjusted to 4.0 with a 15% aqueous solution of sulfuric acid. While nitrogen gas was introduced into the flask, the temperature of the inside of the flask was elevated to 60° C., and 36.5 g of a 5% aqueous solution of ammonium persulfate was added. Polymerization was then started. The reaction mixture was maintained at 75° C., and 1.5 hours after the starting of the polymerization, 1.82 g of a 5% aqueous solution of ammonium persulfate was added. Furthermore, the reaction mixture was maintained at 75° C. for 1.5 hours to complete the polymerization reaction. Thus, an aqueous solution of a stable amphoteric copolymer having a total solides content of 15.4%, a Brookfield viscosity at 25° C. of 6,500 cps and a pH of 4.3 was obtained. This copolymer is designated as copolymer A.

EXAMPLE 2

Polymerization reaction was carried out as in Example 1 in accordance with the monomer formulations shown in Table 1 to give aqueous copolymer solutions B to R. In order to obtain substantially the same viscosities, the amount of the chain transfer agent was properly changed.

COMPARATIVE EXAMPLE

Polymerization reaction was carried out as in Example 1 in accordance with the monomer formulations shown in Table 2 to give aqueous copolymer solutions a to k. In this case, too, the amount of te chain transfer agent was properly changed.

Tables 1 and 2 summarize the properties of the copolymers obtained in Examples 1 and 2 and Comparative Example.

TABLE 1

| Co-polymer No. | Monomer composition of copolymer (mole %) | | | | Properties | |
|---|---|---|---|---|---|---|
| | (a) Cationic monomer | (b) IA | (c) AAm | (b)/(a) | Total solids (%) | Viscosity 25° C. (cps) |
| Invention | | | | | | |
| A | DPA | 3 | 0.5 | 96.5 | 0.17 | 15.4 | 6500 |
| B | " | 3 | 0.9 | 96.1 | 0.3 | 15.4 | 6100 |
| C | " | 3 | 1.5 | 95.5 | 0.5 | 15.4 | 6250 |
| D | " | 5 | 0.5 | 94.5 | 0.1 | 15.3 | 9200 |
| E | " | 5 | 1 | 94 | 0.2 | 15.2 | 7200 |
| F | " | 5 | 1.5 | 93.5 | 0.3 | 15.4 | 6200 |
| G | " | 5 | 2 | 93 | 0.4 | 15.4 | 7450 |
| H | " | 5 | 2.5 | 92.5 | 0.5 | 15.4 | 7100 |
| I | " | 5 | 3 | 92 | 0.6 | 15.4 | 6600 |
| J | " | 10 | 1 | 89 | 0.1 | 15.5 | 7000 |
| K | " | 10 | 3 | 87 | 0.3 | 15.5 | 7450 |
| L | " | 10 | 5 | 85 | 0.5 | 15.6 | 6250 |
| M | " | 20 | 2 | 78 | 0.1 | 15.6 | 7600 |
| N | " | 20 | 6 | 74 | 0.3 | 15.8 | 8450 |
| O | " | 20 | 10 | 70 | 0.5 | 15.5 | 7000 |
| P | DPAC | 5 | 1 | 94 | 0.2 | 15.4 | 7200 |
| Q | DP | 5 | 1 | 94 | 0.2 | 15.5 | 6400 |
| R | DPC | 5 | 1 | 94 | 0.2 | 15.4 | 8700 |

In the above tables, the monomers are shown by abbreviations as follows:
DPA: dimethylaminopropyl acrylamide
DPAC: the product of quaternization of DPA with CH$_3$Cl
DP: dimethylaminopropyl methacrylamide
DPC: the product of quaternization of DP with CH$_3$Cl
IA: itaconic acid
AAm: acrylamide

TABLE 2

| Copolymer No. | Monomer composition of copolymer (mole %) | | | | | Properties | |
|---|---|---|---|---|---|---|---|
| | (a) Cationic monomer | (b) Anionic monomer | | (c) AAm | (b)/(a) | Total solids (%) | Viscosity 25° C. (cps) |
| Comparison | | | | | | | |
| a | DPA | 3 | — | | 97 | 0 | 15.4 | 6200 |
| b | " | 3 | IA | 2.1 | 94.9 | 0.7 | 15.3 | 6600 |
| c | " | 5 | — | | 95 | 0 | 15.6 | 7800 |
| d | " | 5 | IA | 3.5 | 91.5 | 0.7 | 15.5 | 7200 |
| e | " | 10 | — | | 90 | 0 | 15.5 | 7400 |
| f | " | 10 | IA | 7 | 83 | 0.7 | 15.4 | 6800 |
| g | " | 20 | — | | 80 | 0 | 15.6 | 6550 |
| h | " | 20 | IA | 14 | 66 | 0.7 | 15.5 | 6200 |

TABLE 2-continued

| Copolymer No. | Monomer composition of copolymer (mole %) | | | | | | Properties | |
|---|---|---|---|---|---|---|---|---|
| | (a) Cationic monomer | | (b) Anionic monomer | | (c) AAm | (b)/(a) | Total solids (%) | Viscosity 25° C. (cps) |
| i | " | 5 | MA | 1 | 94 | 0.2 | 15.3 | 8450 |
| j | " | 5 | AA | 2 | 93 | 0.4 | 15.4 | 6200 |
| k | " | 5 | MAA | 2 | 93 | 0.4 | 15.4 | 6450 |
| l | DM | 5 | IA | 1 | 94 | 0.2 | 15.5 | 9200 |
| m | DMC | 5 | " | 1 | 94 | 0.2 | 15.3 | 9550 |
| n | DA | 5 | " | 1 | 94 | 0.2 | 15.3 | 4700 |
| o | DAC | 5 | " | 1 | 94 | 0.2 | 15.3 | 6400 |

The monomers are shown by abbreviations in the above table as follows:

DM: dimethylaminoethyl methacrylate
DMC: the product of quaternization of DM with CH$_3$Cl
DA: dimethylaminoethyl acrylate
DAC: the product of quaternization of DA with CH$_3$Cl
MA: maleic acid
AA: acrylic acid
MAA: methacrylic acid

APPLICATION EXAMPLE 1

In order to determine the effect of the papermaking additives of this invention in calcium carbonate filled paper, a 2.5% aqueous dispersion of pulp [bleached kraft pulp: hard wood/soft wood=8/2, 395 ml Canadian standard freeness (CSF)] was mixed with 20%, based on the pulp, of calcium carbonate, 0.4%, based on the pulp, of each of the copolymers obtained in Examples and Comparative Example, and 0.1%, based on the pulp, of Hercon W (an alkylketene dimer sizing agent made by DIC-HERCULES CHEMICALS, INC.). The pulp slurry was then diluted to 0.25%, and formed into a sheet by the Noble & Wood laboratory hand sheet machine at a pH of 8.0, and then dried at 100° C. for 80 seconds by a drum dryer to give a hand-formed sheet having a basis weight of 70±2 g/m$^2$. The sheet was conditioned at 20° C. and 65% RH for 24 hours, and used in various measurements. The results of the measurements are shown in Table 3.

The results shown in Table 3 demonstrate that the papermaking additive of this invention comprising a copolymer of dimethylaminopropyl (meth)acrylamide or its quaternized product, itaconic acid, and acrylamide has better effects of increasing paper strength and the retention of a filler and a sizing agent than other copolymers.

TABLE 3

| Copolymer No. | Stockigt sizing degree (sec) | Internal bond strength (kgfcm) | Stiffness | Brightness (%) | (%) | Filler content (%) | Dry pick | Wet pick |
|---|---|---|---|---|---|---|---|---|
| Invention | | | | | | | | |
| D | 18.0 | 0.58 | 7.9 | 81.4 | 85.8 | 9.5 | 4.2 | 3.8 |
| E | 22.2 | 0.64 | 7.5 | 81.5 | 86.0 | 8.6 | 4.4 | 4.1 |
| G | 23.0 | 0.71 | 8.9 | 81.1 | 85.4 | 8.0 | 4.4 | 4.0 |
| I | 21.0 | 0.75 | 7.5 | 81.0 | 84.0 | 7.2 | 4.4 | 3.9 |
| P | 19.9 | 0.71 | 7.1 | 81.3 | 85.4 | 8.4 | 4.2 | 3.8 |
| Q | 21.1 | 0.81 | 8.0 | 81.0 | 85.2 | 8.6 | 4.2 | 4.4 |
| R | 19.6 | 0.78 | 8.2 | 80.8 | 85.3 | 7.7 | 4.5 | 4.0 |
| Comparison | | | | | | | | |
| b | 10.8 | 0.46 | 7.6 | 81.4 | 84.1 | 7.3 | 4.2 | 3.6 |
| i | 17.3 | 0.70 | 7.9 | 81.0 | 84.8 | 7.7 | 4.1 | 3.5 |
| j | 12.5 | 0.55 | 6.9 | 80.6 | 83.3 | 6.2 | 3.8 | 3.4 |
| k | 15.0 | 0.57 | 7.2 | 81.1 | 84.4 | 7.6 | 3.8 | 3.4 |
| l | 15.7 | 0.63 | 7.0 | 80.5 | 83.0 | 5.4 | 4.2 | 3.5 |
| m | 17.4 | 0.63 | 7.2 | 80.7 | 83.6 | 6.6 | 4.1 | 3.3 |
| n | 17.2 | 0.70 | 7.1 | 80.1 | 83.6 | 5.4 | 3.0 | 2.5 |
| o | 17.9 | 0.83 | 7.6 | 80.7 | 84.7 | 7.5 | 2.8 | 3.1 |
| Blank | 1.0 | 0.54 | 7.6 | 80.4 | 81.8 | 3.6 | 2.7 | 1.0 |

The measurements shown in Table 3 were carried out by the following methods.
Stöckigt sizing degree
JIS P-8122
Internal bond strength
Measured by using an internal bond tester (made by Nihon Rigaku Kogyo K.K.). Bonding conditions: 5 kg/inch$^2$ and 1 minute
Stiffness
JIS P-8125
Brightness
JIS P-8123
Opacity
JIS P-8138
Content of a filler
The ash content measured in accordance with JIS P-8128 was multiplied by 1.78 to obtain the amount of CaO. The amount of CaO was then converted into the amount of CaCO$_3$.
Dry pick
The sheet was printed by an RI printing tester (made by Akira Seisakusho), and the state of picking was visually observed, and rated by numerals from 5 (excellent) to 1 (poor).
Wet pick
The surface of the sheet was first wetted with a water supply roll, and then printed by an RI printing tester. The state of picking was visually observed, and rated by numerals from 5 (excellent) to 1 (poor).

APPLICATION EXAMPLE 2

The properties of the papermaking additive of this invention were examined in the sheet formation of unbleached kraft pulp (which is usually formed into a sheet in an alkaline pH region except when an excessive amount of alum is used).

A 2.5% aqueous dispersion of pulp (soft wood unbleached kraft pulp, 377 ml CSF) was mixed with 0.4%, based on the pulp, of each of the polymers obtained in Examples and Comparative Example and 0.1%, based on the pulp, of Hercon W. The pulp slurry was diluted to 0.25%, and formed into a sheet at a pH of 7.5 by the Noble & Wood laboratory hand sheet machine, and then dried by a drum dryer at 110° C. for 1.5 minutes to form a hand sheet (I) having a basis weight of 85±2 g/m² and a hand sheet (II) having a basis weight of 170±3 g/m². To examine their drainage property, the DDT (note *1) values of these slurries were measured by using the 0.25% pulp slurry. The sheets (I) and (II) were conditioned at 20° C. and 65% RH for 24 hours. The burst factor (JIS P-8112) and Stöckigt sizing degree (JIS P-8122) of the sheet (I) and the ring crush factor (JIS P-8126) of the sheet (II) were measured, and the results are shown in Table 4.

It is clearly seen from Table 4 that the copolymers having the composition in accordance with this invention showed superior properties to copolymers of other compositions.

TABLE 4

| Co-polymer No. | DDT (*1) 200 ml (sec) | Stockigt sizing degree (sec) | Burst factor | Ring crush factor |
| --- | --- | --- | --- | --- |
| Invention | | | | |
| D | 33.0 | 50.8 | 5.21 | 22.9 |
| E | 25.7 | 55.5 | 5.39 | 24.1 |
| P | 34.7 | 49.4 | 5.22 | 23.1 |
| Q | 35.8 | 52.5 | 5.28 | 23.4 |
| R | 33.9 | 50.1 | 5.28 | 22.6 |
| Comparison | | | | |
| i | 39.5 | 47.2 | 5.24 | 21.8 |
| j | 40.7 | 44.9 | 5.07 | 21.7 |
| k | 47.3 | 45.6 | 5.17 | 21.2 |
| l | 60.8 | 45.8 | 5.02 | 21.6 |
| m | 42.3 | 49.3 | 5.04 | 22.2 |
| n | 50.6 | 49.0 | 4.99 | 22.4 |
| o | 46.4 | 48.6 | 5.03 | 22.2 |
| Blank | 36.0 | 41.4 | 4.18 | 21.2 |

(*1): DDT

Using the same apparatus as the "Dynamic Drainage Jar" described at page 46 of TAPPI Journal, vol. 56, No. 10 (1973), a pulp slurry (800 ml) was poured into a jar having a diameter of about 7.5 cm. With stirring at 800 rpm, a cock at the lower portion was opened to filter the slurry through a 100-mesh wire gauze. The time which elapsed until the amount of the filtrate became 200 ml was measured.

APPLICATION EXAMPLE 3

In order to examine the properties of the papermaking additive of this invention under papermaking conditions in a nearly neutral pH region using a small amount of alum, a 2.5% aqueous dispersion of pulp (used corrugated board 390 ml CSF) was mixed with 0.5%, based on the pulp, of alum, 0.4%, based on the pulp, of the copolymer, and 0.06%, based on the pulp, of a sizing agent (alkenylsuccinic anhydride) successively. The pulp slurry was diluted to 0.25%. The DDT of the pulp slurry was measured. Also, the pulp slurry was formed into a sheet by the Noble & Wood laboratory hand sheet machine at a pH of 6.5, and dried by a drum dryer at 110° C. for 1.5 minutes to give a hand sheet (I) having a basis weight of 81±2 g/m² and a hand sheet (II) having a basis weight of 165±2 g/m². Using the sheets (I) and (II), Stöckigt sizing degree, burst factor and ring crush factor were measured as in Application Example 2. The results are shown in Table 5.

TABLE 5

| Co-polymer No. | DDT (*1) 200 ml (sec) | Stockigt sizing degree (sec) | Burst factor | Ring crush factor |
| --- | --- | --- | --- | --- |
| Invention | | | | |
| D | 31.7 | 13.2 | 2.97 | 19.0 |
| E | 30.9 | 14.0 | 2.98 | 19.3 |
| P | 33.9 | 14.1 | 2.91 | 19.5 |
| Q | 31.1 | 13.1 | 2.94 | 19.2 |
| R | 32.5 | 12.9 | 2.88 | 19.0 |
| Comparison | | | | |
| i | 33.7 | 11.7 | 2.87 | 18.9 |
| j | 44.1 | 9.9 | 2.68 | 18.6 |
| k | 32.1 | 11.0 | 2.69 | 18.9 |
| l | 34.2 | 10.7 | 2.86 | 18.9 |
| m | 35.1 | 11.2 | 2.82 | 18.7 |
| n | 37.1 | 11.4 | 2.83 | 19.0 |
| o | 36.0 | 11.9 | 2.81 | 18.5 |
| Blank | 90.5 | 9.0 | 2.33 | 17.1 |

When under papermaking conditions in a nearly neutral pH region using a small amount of alum, an alpha,-beta-unsaturated dicarboxylic acid is used as a constituent of the anionic monomer, the papermaking additive shows better properties than in the case of using an alpha,beta-unsaturated monocarboxylic acid. The properties of the papermaking additive were particularly good when itaconic acid was used as the constituent monomer.

APPLICATION EXAMPLES 4–6

In order to examine the monomer composition of the copolymer of this invention, paper sheets were made by the same method as in Application Examples 1 to 3 using copolymers comprising dimethylaminopropyl acrylamide as the component (a), and itaconic acid as the component (b). The properties of the sheets were measured, and the results are shown in Tables 6, 7, and 8.

It is seen from these tables that the papermaking additive in accordance with this invention shows a particularly good paper strength increasing effect and an effect of increasing the retentions of the filler and sizing agent when the proportion of the component (a) is 2 to 10 mole %, the proportion of the component (b) is 0.2 to 6 mole %, and the proportion of the component (c) is 97.8 to 84 mole % with the (b)/(a) mole ratio being from 0.1 to 0.6.

TABLE 6

| | Copolymer | | | Stockigt | | | Internal | | | |
| --- | --- | --- | --- | --- | --- | --- | --- | --- | --- | --- |
| No. | DPA (mole %) | IA/DPA (mole ratio) | (*2) T.M. (%) | sizing degree (sec) | Burst factor (%) | Stiffness | bond strength (kgfcm) | Filler content (%) | Dry pick | Wet pick |
| Invention | | | | | | | | | | |
| A | 3 | 0.17 | 35.8 | 12.8 | 2.19 | 7.6 | 0.94 | 8.7 | 4.1 | 3.9 |
| B | | 0.3 | 33.3 | 14.3 | 2.25 | 7.9 | 0.96 | 7.8 | 3.9 | 3.8 |

TABLE 6-continued

| No. | Copolymer DPA (mole %) | IA/DPA (mole ratio) | (*2) T.M. (%) | Stockigt sizing degree (sec) | Burst factor (%) | Stiffness | Internal bond strength (kgfcm) | Filler content (%) | Dry pick | Wet pick |
|---|---|---|---|---|---|---|---|---|---|---|
| C | | 0.5 | 35.0 | 12.2 | 2.37 | 8.0 | 0.95 | 8.1 | 4.2 | 4.2 |
| Comparison | | | | | | | | | | |
| a | | 0 | 28.2 | 5.2 | 2.16 | 7.5 | 0.87 | 6.8 | 3.7 | 3.6 |
| b | | 0.7 | 27.8 | 8.0 | 2.13 | 7.4 | 0.89 | 6.2 | 3.5 | 3.7 |
| Invention | | | | | | | | | | |
| D | 5 | 0.1 | 39.0 | 12.1 | 2.25 | 8.2 | 0.96 | 10.3 | 4.2 | 4.1 |
| E | | 0.2 | 45.1 | 16.4 | 2.23 | 7.7 | 0.94 | 10.7 | 4.1 | 4.4 |
| F | | 0.3 | 43.3 | 19.9 | 2.26 | 8.5 | 0.95 | 10.1 | 4.0 | 4.2 |
| H | | 0.5 | 38.0 | 16.6 | 2.33 | 8.3 | 1.06 | 8.9 | 4.3 | 4.2 |
| Comparison | | | | | | | | | | |
| c | | 0 | 32.9 | 5.4 | 2.17 | 7.5 | 0.90 | 8.0 | 4.0 | 3.3 |
| d | | 0.7 | 30.5 | 9.5 | 2.20 | 7.2 | 0.89 | 7.3 | 3.7 | 3.6 |
| Invention | | | | | | | | | | |
| J | 10 | 0.1 | 41.2 | 15.1 | 2.19 | 8.3 | 0.92 | 11.2 | 4.2 | 4.4 |
| K | | 0.3 | 43.0 | 14.9 | 2.25 | 8.4 | 1.06 | 11.2 | 4.2 | 4.2 |
| L | | 0.5 | 39.2 | 15.0 | 2.35 | 8.4 | 1.12 | 10.1 | 4.5 | 4.5 |
| Comparison | | | | | | | | | | |
| e | | 0 | 34.1 | 8.6 | 2.18 | 8.1 | 0.88 | 8.4 | 3.7 | 4.0 |
| f | | 0.7 | 33.2 | 9.8 | 2.13 | 7.8 | 0.92 | 7.7 | 3.9 | 3.5 |
| Invention | | | | | | | | | | |
| M | 20 | 0.1 | 48.0 | 12.0 | 2.10 | 8.4 | 0.92 | 11.6 | 4.1 | 4.3 |
| N | | 0.3 | 46.5 | 11.4 | 2.15 | 7.8 | 1.06 | 11.6 | 4.2 | 4.2 |
| O | | 0.5 | 44.3 | 10.9 | 2.13 | 8.2 | 1.08 | 10.9 | 4.2 | 4.2 |
| Comparison | | | | | | | | | | |
| g | | 0 | 38.5 | 10.3 | 1.95 | 8.0 | 0.93 | 9.8 | 3.9 | 3.9 |
| h | | 0.7 | 37.0 | 10.4 | 2.02 | 7.9 | 0.91 | 9.2 | 3.8 | 3.7 |
| Blank | | | 19.5 | 1.7 | 1.98 | 7.1 | 0.81 | 5.0 | 3.2 | 2.1 |

Papermaking conditions
Pulp: bleached kraft pulp; hard wood/soft wood=8/2, 385 ml CSF
Chemicals: 20% calcium carbonate, 0.4% copolymer, 0.1% Hercon W
Running pH: 8.0
Drying: 100° C., 80 seconds
Basis weight: 70±2 g/m$^2$
Note (*2): T. M. (%)
By using the same device as the modified Hercules dynamic drainage tester as described in Papermakers Conference (page 171, 1985) (having such a structure that a pulp slurry is poured into a jar having a diameter of about 7.5 cm and with agitation, air is sent from the lower portion so as not form a mat, and the filtration of the slurry is effected as soon as the agitation and the sending of air are stopped), 300 ml of a pulp slurry was poured into the jar, and 70 ml of the filtrate was taken. The transmittance at 620 nm (T.M. %) of this filtrate was measured. T. M. (%) was used as a parameter of the first pass retention. Specifically, the higher the T. M. %, the clearer the filtrate. This shows higher ratios of the filler effectively utilized (retention).

TABLE 7

| No. | Copolymer DPA (mole %) | IA/DPA (mole ratio) | Stockigt sizing degree (sec) | Burst factor (%) | Ring crush factor |
|---|---|---|---|---|---|
| Invention | | | | | |
| A | 3 | 0.17 | 45.0 | 4.82 | 23.1 |
| B | | 0.3 | 49.2 | 4.76 | 23.7 |
| C | | 0.5 | 44.9 | 4.80 | 23.3 |
| Comparison | | | | | |
| a | | 0 | 41.8 | 4.69 | 22.3 |
| b | | 0.7 | 40.6 | 4.71 | 22.6 |
| Invention | | | | | |
| D | 5 | 0.1 | 47.1 | 4.91 | 23.5 |
| E | | 0.2 | 49.5 | 4.88 | 23.4 |
| F | | 0.3 | 48.9 | 4.87 | 24.3 |
| H | | 0.5 | 47.5 | 4.87 | 23.7 |
| Comparison | | | | | |
| c | | 0 | 42.3 | 4.79 | 22.7 |
| d | | 0.7 | 43.0 | 4.73 | 22.5 |
| Invention | | | | | |
| J | 10 | 0.1 | 51.1 | 4.82 | 23.5 |
| K | | 0.3 | 55.9 | 4.83 | 23.5 |
| L | | 0.5 | 49.6 | 4.89 | 24.3 |
| Comparison | | | | | |
| e | | 0 | 46.0 | 4.74 | 22.4 |
| f | | 0.7 | 45.2 | 4.78 | 21.9 |
| Invention | | | | | |
| M | 20 | 0.1 | 55.6 | 4.69 | 23.3 |
| N | | 0.2 | 54.7 | 4.78 | 23.1 |
| O | | 0.5 | 51.7 | 4.82 | 23.7 |
| Comparison | | | | | |
| g | | 0 | 47.5 | 4.51 | 22.5 |
| h | | 0.7 | 48.1 | 4.46 | 22.1 |
| Blank | | | 37.7 | 3.81 | 21.0 |

Papermaking conditions
Pulp: soft wood unbleached kraft pulp 354 ml CSF
Chemicals: 0.4% copolymer, 0.1% Hercon W
Running pH: 7.5
Drying: 110° C., 1.5 minutes
Basis weight: 82±2 g/m$^2$, 162±3 g/m$^2$

TABLE 8

| No. | Copolymer DPA (mole %) | IA/DPA (mole ratio) | Stockigt sizing degree (sec) | Burst factor (%) | Ring crush factor |
|---|---|---|---|---|---|
| Invention | | | | | |
| A | 3 | 0.17 | 7.7 | 2.64 | 16.7 |
| B | | 0.3 | 9.0 | 2.80 | 17.2 |

TABLE 8-continued

| Copolymer No. | DPA (mole %) | IA/DPA (mole ratio) | Stockigt sizing degree (sec) | Burst factor | Ring crush factor |
|---|---|---|---|---|---|
| C | | 0.5 | 10.0 | 2.81 | 17.6 |
| Comparison | | | | | |
| a | | 0 | 6.4 | 2.49 | 15.9 |
| b | | 0.7 | 6.2 | 2.66 | 16.1 |
| Invention | | | | | |
| D | 5 | 0.1 | 7.6 | 2.88 | 16.6 |
| E | | 0.2 | 7.9 | 2.85 | 17.0 |
| F | | 0.3 | 8.1 | 2.79 | 17.2 |
| H | | 0.5 | 9.0 | 2.76 | 17.1 |
| Comparison | | | | | |
| c | | 0 | 6.1 | 2.68 | 16.0 |
| d | | 0.7 | 6.4 | 2.73 | 16.5 |
| Invention | | | | | |
| J | 10 | 0.1 | 11.9 | 2.77 | 16.7 |
| K | | 0.3 | 11.9 | 2.74 | 17.1 |
| L | | 0.5 | 11.4 | 2.79 | 17.6 |
| Comparison | | | | | |
| e | | 0 | 6.2 | 2.44 | 16.3 |
| f | | 0.7 | 6.5 | 2.68 | 16.6 |
| Invention | | | | | |
| M | 20 | 0.1 | 15.4 | 2.62 | 16.3 |
| N | | 0.3 | 21.2 | 2.60 | 16.7 |
| O | | 0.5 | 22.9 | 2.58 | 16.5 |
| Comparison | | | | | |
| g | | 0 | 11.2 | 2.43 | 16.1 |
| h | | 0.7 | 12.3 | 2.55 | 16.0 |
| Blank | | | 5.7 | 2.28 | 15.6 |

Papermaking conditions
Pulp: used corrugated board 385 ml CSF
Chemicals: 0.5% alum, 0.4% copolymer, 0.06% alkenylsuccinic anhydride sizing agent
Running pH: 6.5
Drying: 110° C., 1.5 minutes
Basis weight: 81±2 g/m², 162±3 g/m²

APPLICATION EXAMPLE 7

Copolymers E and Q of this invention composed of (a) dimethylaminopropyl (meth)acrylamide or its quaternized product, (b) itaconic acid and (c) acrylamide and comparative copolymers m and n composed of an ester-type cationic monomer instead of the component (a), itaconic acid (b), and acrylamide (c) were examined for the cationic property of a dilute aqueous solution thereof dissolved at a neutral to alkaline pH and for the state of degradation of their properties.

The cationic character was examined by maintaining a 0.05% aqueous solution of each of the copolymers at a pH of 6.5, and a 0.05% aqueous solution of each of the copolymers at a pH of 8.5 at 32° C., and 5 minutes later and one day later, the degree of cationic character at a pH of 3.0 was measured by colloid titration. The resulsts are shown in Table 9.

Using a 0.5% aqueous solution of the copolymer at pH 6.5 and a 0.5% aqueous solution of the copolymer at pH 8.5 which had been maintained at 32° C. for 5 hours, sheet formation was carried out in the same way as in Application Example 1. The properties of the resulting sheets were measured, and the results are shown in Table 10.

It is seen from Tables 9 and 10 that the copolymers in accordance with this invention scarcely undergo degradation in cationic property and other various properties even when maintained in a neutral to alkaline pH region, and exhibit an excellent effect.

TABLE 9

| | Degree of cationic character (at pH 3.0) | | | |
|---|---|---|---|---|
| | 32° C. pH 6.5 | | 32° C. pH 8.5 | |
| Copolymer No. | After 5 minutes | After 1 day | After 5 minutes | After 1 day |
| Invention | | | | |
| E | 0.69 | 0.69 | 0.69 | 0.69 |
| Q | 0.68 | 0.68 | 0.68 | 0.67 |
| Comparison | | | | |
| m | 0.65 | 0.44 | 0.60 | 0.29 |
| n | 0.66 | 0.48 | 0.57 | 0.04 |

(unit: meq/g solid)

TABLE 10

| Copolymer No. | Pretreated conditions | T.M. (%) | Stockigt sizing degree (sec) | Internal bond strength (kgfcm) | Filler content (%) |
|---|---|---|---|---|---|
| Invention | | | | | |
| E | Standard | 42.9 | 21.0 | 0.72 | 9.8 |
| | pH 6.5 | 42.1 | 21.4 | 0.70 | 9.4 |
| | pH 8.5 | 43.4 | 22.0 | 0.76 | 9.8 |
| Q | Standard | 44.2 | 21.5 | 0.78 | 9.5 |
| | pH 6.5 | 44.8 | 23.0 | 0.74 | 9.8 |
| | pH 8.5 | 43.9 | 21.8 | 0.75 | 9.6 |
| Comparison | | | | | |
| m | Standard | 39.5 | 18.0 | 0.73 | 7.8 |
| | pH 6.5 | 37.5 | 17.2 | 0.61 | 7.3 |
| | pH 8.5 | 35.1 | 10.8 | 0.59 | 5.7 |
| n | Standard | 40.1 | 17.5 | 0.74 | 7.3 |
| | pH 6.5 | 34.5 | 13.7 | 0.63 | 5.9 |
| | pH 8.5 | 28.7 | 8.3 | 0.52 | 4.7 |
| Blank | | 22.4 | 1.5 | 0.54 | 4.0 |

Pretreating conditions
Standard: The copolymer was dissolved to a concentration of 0.5% and immediately used.
pH 6.5, pH 8.5: A 0.5% aqueous solution of the copolymer adjusted to pH 6.5 or 8.5 was maintained at 32° C. for 5 hours.
Papermaking conditions
Pulp: bleached kraft pulp; hard wood/soft wood=8/2 380 ml CSF
Chemicals: 20% calcium carbonate, 0.5% copolymer, 0.1% Hercon W (based on pulp)
Running pH: 8.0
Drying: 100° C., 80 seconds
Basis weight: 70±2 g/m²
What we claim is:

1. A papermaking additive useful for papermaking in a neutral to alkaline pH region which comprises a water-soluble copolymer composed of (a) 1 to 20 mole % of dimethylaminopropyl (meth)acrylamide or its quaternized product, (b) 0.1 to 12 mole % of itaconic acid or its salt, and (c) 98.9 to 68 mole % of acrylamide, the (b)/(a) mole ratio being from 0.1 to 0.6.

2. The papermaking additive of claim 1 wherein the water-soluble copolymer is composed of 2 to 10 mole % of the component (a), 0.2 to 6 mole % of the component (b), and 97.8 to 84 mole % of the component (c), and the (b)/(a) mole ratio is from 0.1 to 0.6.

3. The papermaking additive of claim 2 wherein component (a) is dimethylaminopropyl acrylamide.

4. The papermaking additive of claim 2 wherein component (a) is dimethylaminopropyl methacrylamide.

5. The papermaking additive of claim 2 wherein component (a) is the quaternized product of dimethylaminopropyl (meth)acrylamide.

6. The papermaking additive of claim 1 wherein component (a) is dimethylaminopropyl acrylamide.

7. The papermaking additive of claim 1 wherein component (a) is dimethylaminopropyl methacrylamide.

8. The papermaking additive of claim 1 wherein component (a) is the quaternized product of dimethylaminopropyl (meth)acrylamide.

* * * * *